(12) United States Patent
Malerba

(10) Patent No.: US 7,334,839 B1
(45) Date of Patent: Feb. 26, 2008

(54) MOTOR VEHICLE SEAT ASSEMBLY

(76) Inventor: Benjamin Malerba, 3 Longview Ave., Rocky Point, NY (US) 11778

(*) Notice: Subject to any disclaimer, the term of this patent is extended or adjusted under 35 U.S.C. 154(b) by 0 days.

(21) Appl. No.: 11/546,144

(22) Filed: Oct. 11, 2006

(51) Int. Cl.
A47C 7/62 (2006.01)

(52) U.S. Cl. .............................. 297/217.1; 297/217.3; 297/344.23; 601/49

(58) Field of Classification Search ............ 297/217.1, 297/217.3, 344.23; 601/49, 57
See application file for complete search history.

(56) References Cited

U.S. PATENT DOCUMENTS

| 3,037,499 | A | | 6/1962 | Cummins | |
|---|---|---|---|---|---|
| 3,613,671 | A | | 10/1971 | Poor | |
| 3,854,474 | A | | 12/1974 | Carruth | |
| 4,203,098 | A | | 5/1980 | Muncheryan | |
| 4,802,706 | A | * | 2/1989 | Onimaru et al. | ....... 297/344.23 |
| 5,374,238 | A | | 12/1994 | Xiao | |
| 5,411,468 | A | | 5/1995 | Chen | |
| 6,010,192 | A | | 1/2000 | King | |
| 6,676,615 | B2 | | 1/2004 | Flick et al. | |
| 6,744,370 | B1 | * | 6/2004 | Sleichter, III et al. | ........ 601/49 |

FOREIGN PATENT DOCUMENTS

| DE | 32 35 373 | | 3/1984 |
|---|---|---|---|
| JP | 61113527 A | * | 5/1986 |

* cited by examiner

Primary Examiner—Anthony D. Barfield
(74) Attorney, Agent, or Firm—Collard & Roe, P.C.

(57) ABSTRACT

A motor vehicle seat assembly has a seat body including a seat base portion and a seat back portion. A swivel mechanism moves the seat body between a first position for entering or exiting the vehicle and a second position for operating or traveling in the vehicle and includes a weight sensor and a motor for rotating the seat body. When a vehicle door is opened, the motor rotates the seat body into the first position and when the weight sensor detects the presence of an occupant, the motor rotates the seat body into the second position and a seat belt is moved into a position to secure the occupant in the seat body. A pulse sensor triggers an alarm if it detects a pulse rate indicating that the occupant is falling asleep. The assembly further includes a massage system, a heating unit and a cooling unit.

8 Claims, 3 Drawing Sheets

MOTOR VEHICLE SEAT ASSEMBLY

BACKGROUND OF THE INVENTION

1. Field of the Invention

The invention relates to a motor vehicle seat assembly. More particularly, the invention relates to a massaging motor vehicle seat assembly including a pulse sensing sleep prevention device. The invention further relates to a massaging motor vehicle seat assembly adapted to move into a position to facilitate a person's entry into the vehicle.

2. The Prior Art

A number of devices for providing a massage to a person seated in an automobile seat are known. The following references, the disclosures of which are hereby incorporated herein by reference, relate to various devices which can be incorporated into a motor vehicle seat for providing a massage to a person seated therein.

German Patent No. DE 32 35 373 A1 to Szperkowski shows a massaging head and neck support for the backrest of a vehicle seat. U.S. Pat. No. 6,010,192 to King shows a massaging travel pillow having mounting brackets for attaching to the upper portion of a vehicle seat. U.S. Pat. No. 5,374,238 to Xiao shows a vibrating neck rest adapted for attaching to a passenger seat of a motor vehicle. U.S. Pat. No. 3,613,671 to Poor shows a padded vehicle seat headrest with a number of inflatable air chambers which are sequentially inflated and a deflated to produce a massaging effect.

U.S. Pat. No. 6,676,615 to Flick et al. shows a user-controllable massage device including vibration transducers which are positioned adjacent a vehicle seat. U.S. Pat. No. 5,411,468 to Chen shows a massaging device comprising a massaging cushion or headrest having a hollowed frame connected to the top of a car seat.

Additionally, a number of devices designed to prevent the driver of a motor vehicle from falling asleep while operating the vehicle are known from the following references, the disclosures of which are hereby incorporated herein by reference.

U.S. Pat. No. 4,203,098 to Muncheryan relates to a device for preventing a driver from falling asleep while operating a motor vehicle as well as for stimulating and soothing the driver's muscles. A dashboard-mounted circuit powered by the vehicle's electrical system produces pulsating signals which are transmitted along an electrical cord to units disposed in the vehicle seat back. U.S. Pat. No. 3,037,499 to Cummins discloses a vehicle seat vibrator assembly which may function as a safety device for keeping drowsy drivers alert or as a relaxation device for vehicle passengers.

U.S. Pat. No. 3,854,474 to Carruth relates to a portable, all-purpose vibrating massager.

SUMMARY OF THE INVENTION

The invention relates to a motor vehicle seat assembly. More particularly, the invention relates to a massaging motor vehicle seat assembly including a pulse sensing sleep prevention device. The invention further relates to a massaging motor vehicle seat assembly adapted to move into a position to facilitate a person's entry into the vehicle.

A motor vehicle seat assembly according to an embodiment of the invention includes a seat body with a seat base portion and a seat back portion. The assembly further includes a swivel mechanism for moving the seat body between a first position for entering or exiting the vehicle and a second position for operating or traveling in the vehicle. The swivel mechanism includes a weight sensor disposed in the seat body for detecting a presence of an occupant of the seat body and a motor coupled to the seat base portion for rotating the seat body.

When a vehicle door is opened, the swivel mechanism motor rotates the seat body into the first position for entering or exiting the vehicle. When the weight sensor detects the presence of the occupant, the motor rotates the seat body into the second position for operating or traveling in the vehicle and a seat belt is moved into a position to secure the occupant in the seat body.

A motor vehicle seat assembly according to an embodiment of the invention further includes a massage system for providing a massage to the occupant of the seat body. The massage system extends along the seat base portion and seat back portion. The massage system may include a plurality of shafts disposed in the seat body, a plurality of sleeves, at least one of which is disposed on each of the shafts, a plurality of massaging elements disposed on each of the sleeves, and a drive motor coupled to at least one of the shafts. The drive motor rotates at least one of the shafts, causing a sleeve and an associated plurality of massaging elements to move linearly across the seat body to produce a massaging effect.

A motor vehicle seat assembly according to an embodiment of the invention further includes a pulse sensor for detecting a pulse of the occupant of the seat body. The pulse sensor is coupled to the massage system and to an alarm device such that when the pulse sensor detects a pulse rate indicating that the occupant is falling asleep, the massage system is disabled and the alarm device is triggered.

A motor vehicle seat assembly according to an embodiment of the invention further includes a heating unit disposed in the seat body for heating the occupant of the seat body and a cooling unit disposed in the seat body for cooling the occupant of the seat body.

A motor vehicle seat assembly according to an embodiment of the invention provides the advantages of a swivel mechanism for automatically moving the seat between a first position to facilitate entering or exiting a motor vehicle and a second position suitable for operating or riding in the motor vehicle. A motor vehicle seat assembly according to an embodiment of the invention further has the benefit of a massage system incorporated therewith, for providing a massage to a driver or passenger of a motor vehicle. Additionally, a motor vehicle seat assembly according to an embodiment of the invention includes a pulse sensor adapted to detect a pulse of an occupant of the seat to determine whether the occupant is falling asleep and to trigger an alarm in the event of an occupant falling asleep. This feature provides a significant safety feature in preventing a drowsy driver from falling asleep at the wheel.

BRIEF DESCRIPTION OF THE DRAWINGS

Other benefits and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
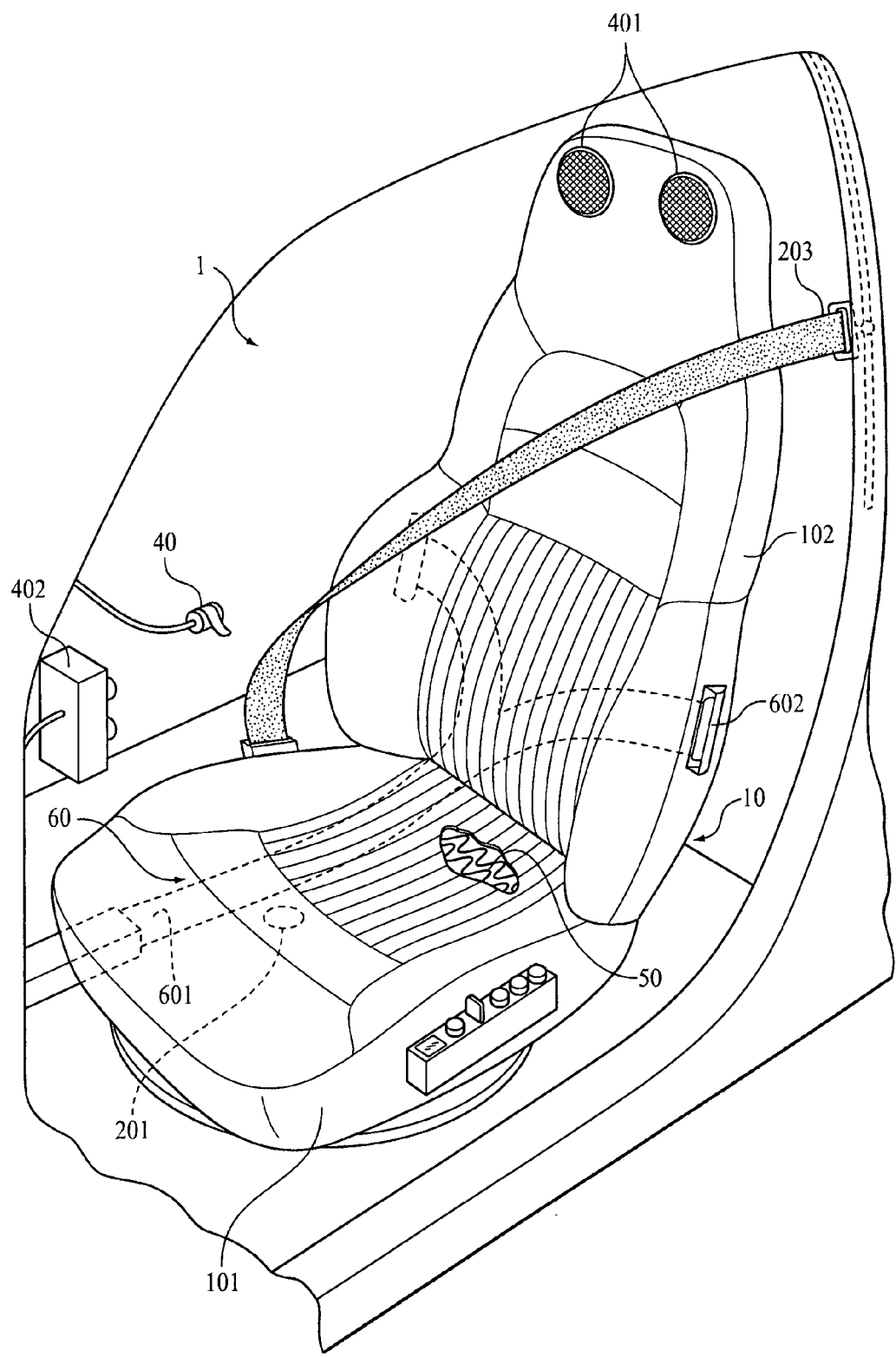
FIG. 1 shows a perspective view of a motor vehicle seat assembly according to an embodiment of the invention.

Referring now in detail to the drawings and, in particular, FIG. 1 shows a perspective view of a motor vehicle seat assembly 1 according to an embodiment of the invention. A motor vehicle seat assembly 1 according to an embodiment of the invention may be, for example a driver seat or a passenger seat of a car, truck or other motor vehicle.

As shown, motor vehicle seat assembly 1 includes a seat body 10 having a seat base portion 101 and a seat back portion 102. Seat body 10 may have an indented or pod-shape which conforms to the contours of a person's back. Seat body 10 may also include a slight curvature on each side.

Figure 3:
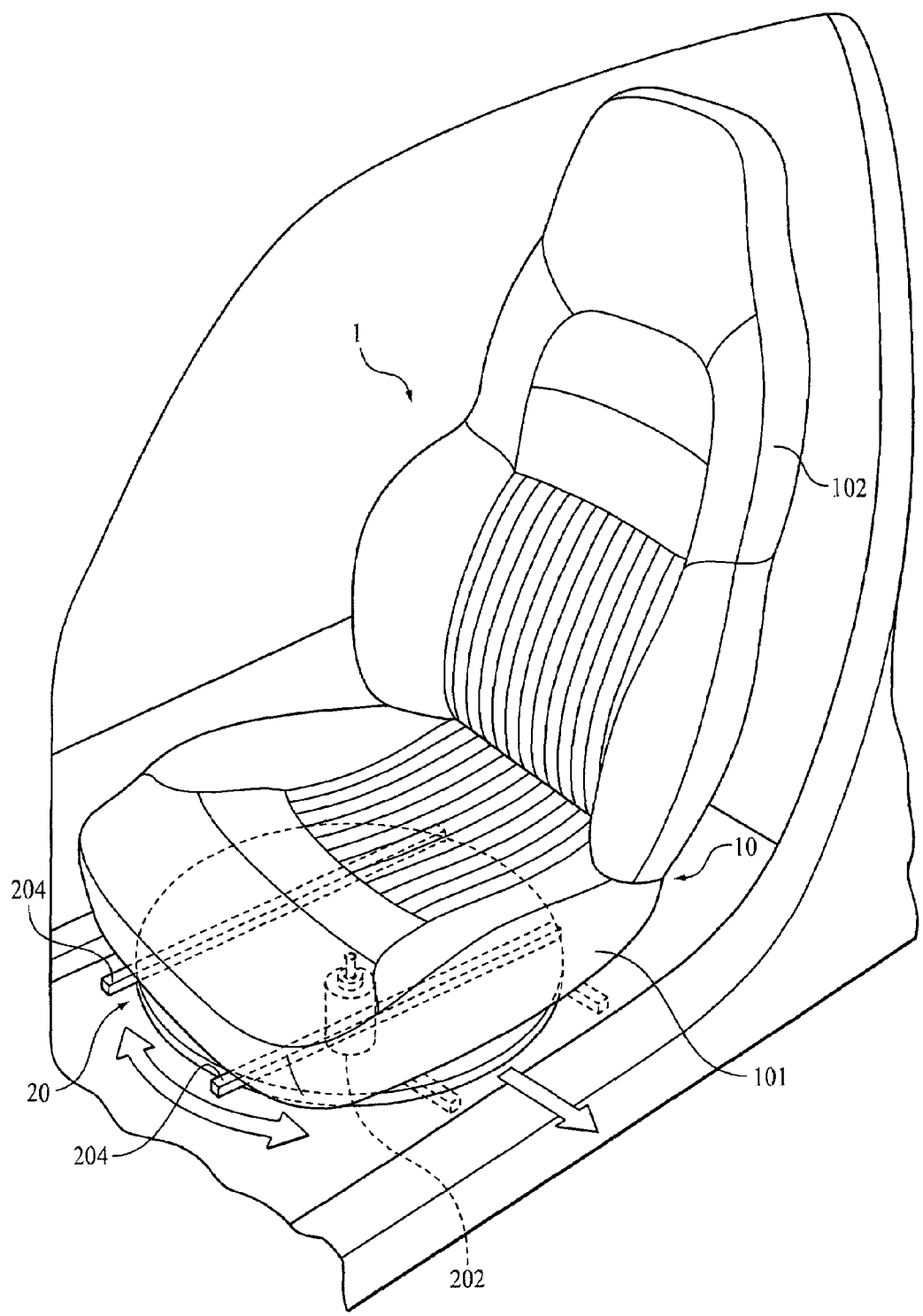
FIG. 3 shows a perspective view of a motor vehicle seat assembly according to an embodiment of the invention, including a swivel mechanism according to an embodiment of the invention.

As best shown in FIG. 3, motor vehicle seat assembly 10 further includes a swivel mechanism 20. Swivel mechanism 20 is adapted to move seat body 10 between a first position for entering or exiting the vehicle and a second position for operating or traveling in the vehicle. For example, a first position may include a position wherein seat body 10 is rotated to face a door opening of the vehicle. In this way, a person can easily enter or exit the vehicle with less effort and stress on the person's body. In the second position, seat body 10 is positioned in a manner appropriate for driving (where the motor vehicle seat assembly 1 comprises a driver's seat) or traveling (where the motor vehicle seat assembly 1 comprises a passenger seat) in the vehicle. For example, if the assembly is a driver's seat, a second position would include a position wherein seat body 10 is rotated to face the front windshield of the vehicle and situates the driver behind the steering wheel in a comfortable position for operating the vehicle.

Swivel mechanism 20 may include a weight sensor 201 (shown in FIG. 1) for detecting a presence of an occupant of seat body 10. Weight sensor 201 is preferably disposed within seat body 10, for example weight sensor 201 may be positioned within seat base portion 101, underneath a fabric or material forming the seating surface. Weight sensor 201 may include any device suitable for detecting the weight of an occupant of seat body 10, for example a strain gauge type sensor, a Hall effect sensor, a magnetic sensor, a transducer or the like. Swivel mechanism 20 further includes a motor 202 (shown in FIG. 3) for rotating seat body 10 between the first and second positions as described above. Motor 202 is coupled to seat base portion 101 for rotating seat body 10 into position.

During operation, swivel mechanism 20 may operate as follows. When a vehicle door is opened, motor 202 rotates seat body 10 into a first position for entering or exiting the vehicle. A driver or passenger than situates themselves in a seated position in seat body 10. Weight sensor 201 detects the presence of the occupant of seat body 10 based on a detected weight. In response to a signal produced by weight sensor 201 when the presence of a seat occupant is detected, motor 202 rotates seat body 10 into a second position for operating or traveling in the vehicle. Once seat body 10 is rotated into this second position, a seat belt 203 may be moved into position to secure the occupant in seat body 10. For example, as shown in FIG. 1, seat belt 203 may comprise an automatic shoulder belt assembly adapted to move along a track disposed on a portion of the motor vehicle. Once seat body 10 is in a position for operating or traveling in the vehicle, seat belt 203 moves from a free position wherein the vehicle occupant can easily enter or exit the vehicle, to a secured position, wherein the vehicle occupant is securely belted into seat body 10.

As illustrated in FIG. 3, swivel mechanism 20 may further include one or more rails 204. Rails 204 are slidably engaged with a bottom surface of seat base portion 101 and may rotate with seat body 10. Seat body 10 is movable along rails 204 for adjusting a position of seat body. For example, seat body 10 may slide out on rails 204 toward a door opening of the vehicle when the seat body is in the first position for entering or exiting the vehicle. Seat body 10 may also slide back and forth along rails 204 when in a second position for operating or traveling in the vehicle so that the occupant of the seat may position the seat in a comfortable position.

Figure 2:
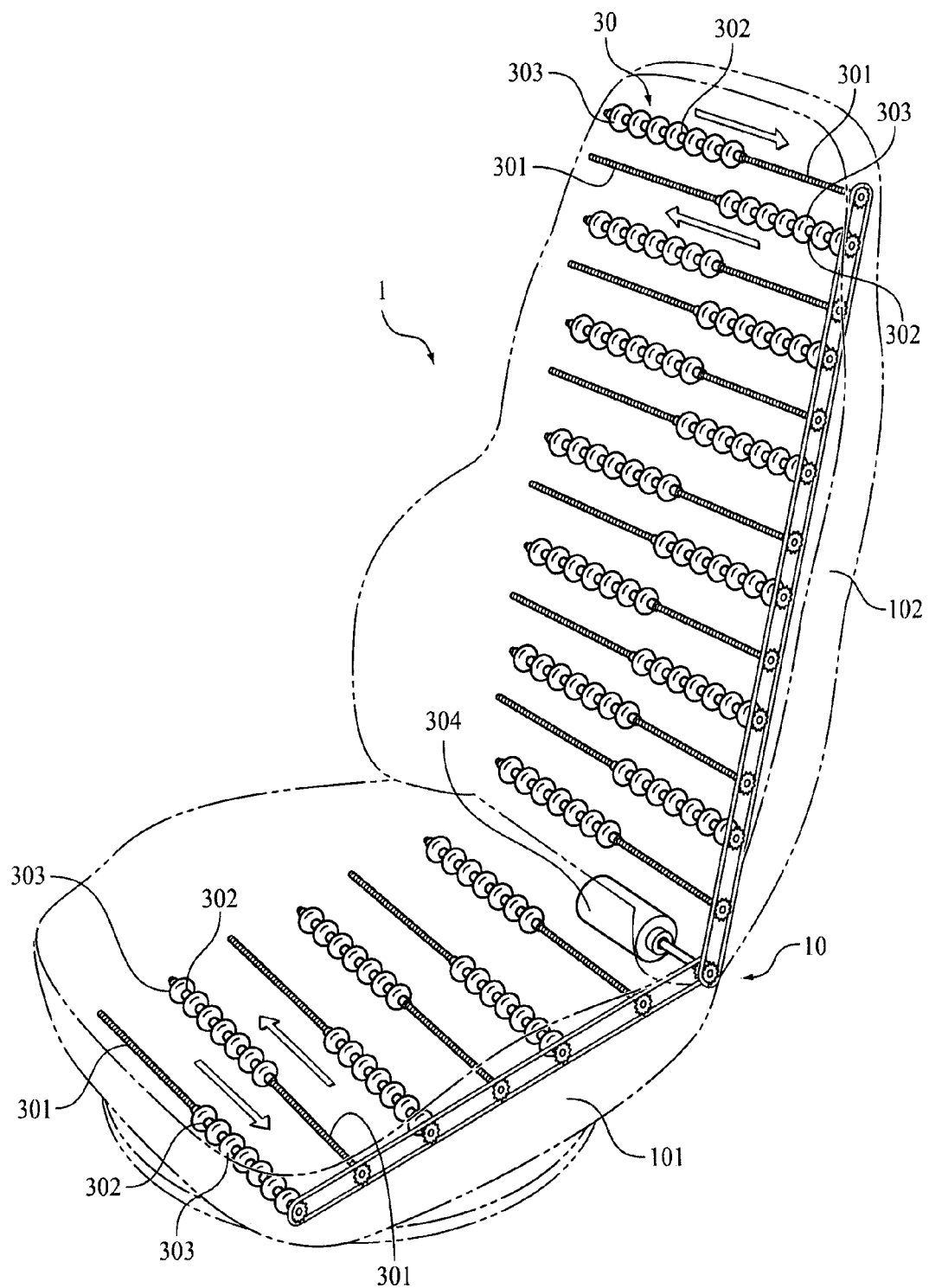
FIG. 2 shows a cutaway perspective view of a motor vehicle seat assembly according to an embodiment of the invention, including a massage system according to an embodiment of the invention.

A motor vehicle seat assembly according to an embodiment of the invention also has a massage system 30 for providing a massage to the occupant of seat body 10. Massage system 10 provides a therapeutic massage to increase driver or passenger comfort, particularly on trips of relatively long duration. Preferably, massage system 30 extends along at least a portion of seat base portion 101 and seat back portion 102. Massage system 30 may extend from an upper or headrest section of seat back 102 to a front section of seat base 101, for example, as illustrated in FIG. 2. In this way, massaging system 30 may provide a massaging effect along a seat occupants' body from the occupant's head and neck all the way down to the occupant's knees.

FIG. 2 shows an embodiment of a massaging system 30 for a motor vehicle seat assembly 1 according to an embodiment of the invention. As shown, massage system 30 includes a plurality of shafts 301 disposed in the seat body 10. The shafts 301 may be threaded rods. Each of shafts 301 may be arranged to extend across a width of seat body 10. As shown, shafts 301 may be dimensioned so that each shaft 301 extends across substantially an entire width of seat body 10 to maximize the massaging effect of massaging system 30 on an occupant's body.

Massage system 30 further includes a plurality of sleeves 302. Each of sleeves 302 is disposed on an associated shaft 301 as shown. Sleeves 302 may be tubular members sized to fit over the associated shaft 301 and sleeves 302 may have an internal thread corresponding to and mating with the thread provided on shafts 301. Each sleeve 302 may extend along approximately one half the length of an associated shaft 301 as shown. A plurality of massaging elements 303 are disposed on each of sleeves 302. Massaging element 303 may comprise, for example, doughnut-shaped members, or any other shape suitable for providing a massaging effect when moved across a person's body.

A drive motor 304 is coupled to at least one of the shafts 301 for rotating the shaft 301. For example, drive motor 304 may be coupled via a chain or belt drive to a gear or pulley disposed on an end of shaft 301. A motor vehicle seat assembly massage system according to an embodiment of the invention may include a single drive motor 304 as illustrated in FIG. 2, or alternatively may include multiple drive motors.

The rotation of one or more of the shafts 301 causes the associated sleeve 302 and the plurality of massaging elements 303 on the sleeve to move linearly or laterally across seat body 10 to produce a massaging effect on the seat occupant. As shown, the shafts 301 may be arranged in a series of substantially parallel rows wherein a first plurality of massaging elements 303 associated with a first shaft 301 is adapted to move in a first direction (indicated by the uppermost arrow in FIG. 2) when a second plurality of massaging elements associated with a second shaft 301, adjacent to the first shaft is, adapted to move in a second direction (indicated by the second arrow from the top in FIG. 2), opposite the first direction. In this way, adjacent rows of massaging elements are adapted to move in opposite directions across the seat body 10, thereby producing a stimulating massaging effect.

When an individual sleeve 302 and massaging elements 303 reach an end portion of a corresponding shaft 301, the direction of travel of sleeve 302 and massaging elements 303 is reversed. This may be accomplished, for example with a reversing motor or motors and position detecting limit switches for detecting when a sleeve 302 reaches an end of the shaft 301. Alternatively, the shaft and sleeve assembly may comprise a self-reversing worm drive configuration.

A motor vehicle seat assembly 1 according to an embodiment of the invention further includes a pulse sensor or monitor 40, as shown in FIG. 1, for detecting a pulse of the occupant of seat body 10. The pulse sensor 40 may be detachably secured to a part of the seat occupant's body, for example a finger, to monitor the seat occupant's pulse. Pulse sensor 40 may be secured to the occupant with a clamping mechanism, hook and loop fasteners, or any other suitable means.

Pulse sensor 40 is coupled to massage system 30 as well as to an alarm device 401, 402 capable of producing an audible alarm for alerting a seat occupant. Alarm device may comprise, for example a standard vehicle sound system or radio 402 or any other device for producing an audible, visible or other type of alarm for alerting a seat occupant. As shown, the alarm device may be in the form of one or more speakers 401 mounted on or adjacent to the seat assembly 1.

When pulse sensor 40 detects a pulse rate indicating that the occupant is falling asleep, massage system 30 is disabled, stopping the massage function and an alarm device is triggered. For example, when pulse sensor 40 detects a pulse rate indicating that the seat occupant is falling asleep, pulse sensor 40 may send a signal which turns radio 402 on, or which increases a volume of radio 402 if the radio is already on. Alternatively or additionally, when pulse sensor 40 detects a pulse rate indicating that the seat occupant is falling asleep, pulse sensor 40 may send a signal to trigger an alarm other than a radio, such as an audible alarm for waking or alerting the seat occupant.

A motor vehicle seat assembly according to an embodiment of the invention further includes a heating unit 50 disposed in seat body 10 for heating the seat occupant in cold weather. Heating unit 50 may be coupled to the vehicle's heating system and may include one or more heating ducts for carrying air heated by the vehicle's engine to the seat body 50 for heating the seat occupant. Alternatively, heating unit 50 may comprise one or more electric heating elements disposed within seat body 10. Preferably, heating unit 50 is adapted to operate independently of the vehicle's engine, so that seat body 10 may be heated whether or not the vehicle's engine is running or warm.

A motor vehicle seat assembly according to an embodiment of the invention further includes a cooling unit 60 disposed in seat body 10 for cooling the seat occupant in warm weather. As shown, cooling unit 60 may comprises one or more ducts 601 coupled to the vehicle's air conditioning system for carrying cooled air to the seat body 10. Cooling unit 60 may further include one or more vents 602 coupled to duct 601 and disposed on or adjacent to seat body 10.

As shown in FIG. 1, a controller may be provided on the motor vehicle seat assembly or proximate thereto. The controller may allow the seat occupant to activate, disable or otherwise control the various features of the seat assembly, including the swivel mechanism 20, massage system 30, pulse sensor 40, heating system 50 and/or cooling system 60. For example, using the controller, a seat occupant may adjust the temperature of the heating or cooling units, disable the swivel mechanism, and/or turn the massage system on or off or adjust the characteristics of the massage.

Accordingly, while only several embodiments of the present invention have been shown and described, it is obvious that many changes and modifications may be made thereunto without departing from the spirit and scope of the invention.

What is claimed is:

1. A motor vehicle seat assembly comprising:
    a) a seat body comprising a seat base portion and a seat back portion;
    b) a swivel mechanism for moving said seat body between a first position for entering or exiting the vehicle and a second position for operating or traveling in the vehicle, said swivel mechanism comprising a weight sensor disposed in said seat body for detecting a presence of an occupant of said seat body and a motor coupled to said seat base portion for rotating said seat body, wherein when a vehicle door is opened, said motor rotates said seat body into said first position and when said weight sensor detects the presence of the occupant, said motor rotates said seat body into said second position and a seat belt is moved into a position to secure the occupant in said seat body;
    c) a massage system for providing a massage to the occupant of said seat body, said massage system extending along said seat base portion and said seat back portion;
    d) a pulse sensor for detecting a pulse of the occupant of said seat body, wherein said pulse sensor is coupled to said massage system and to an alarm device, and wherein when said pulse sensor detects a pulse rate indicating that the occupant is falling asleep, said massage system is disabled and said alarm device is triggered;
    e) a heating unit disposed in said seat body for heating the occupant of said seat body; and
    f) a cooling unit disposed in said seat body for cooling the occupant of said seat body.

2. The motor vehicle seat assembly according to claim 1, wherein said massage system comprises:
    a) a plurality of shafts disposed in said seat body;
    b) a plurality of sleeves, at least one of said plurality of sleeves disposed on each of said plurality of shafts;
    c) a plurality of massaging elements disposed on each of said plurality of sleeves; and
    c) a drive motor coupled to at least one of said plurality of shafts;
    wherein said drive motor rotates said at least one of said plurality of shafts, causing said at least one of said plurality of sleeves and an associated plurality of massaging elements to move linearly across said seat body to produce a massaging effect.

3. The motor vehicle seat assembly according to claim 2, wherein each of said plurality of shafts comprises a threaded rod and each of said plurality of sleeves has an internal thread for mating with said threaded rod.

4. The motor vehicle seat assembly according to claim 2, wherein said plurality of shafts are arranged in a series of substantially parallel rows and wherein a first plurality of massaging elements associated with a first of said plurality of shafts is adapted to move in a first direction when a second plurality of massaging elements associated with a second of said plurality of shafts, adjacent to said first of said plurality of shafts is adapted to move in a second direction, opposite said first direction.

5. The motor vehicle seat assembly according to claim 1, wherein said heating unit comprises a least one electric heating element.

6. The motor vehicle seat assembly according to claim 1, wherein said cooling unit comprises a duct for coupling to an air conditioning system of the vehicle and at least one vent coupled to said duct.

7. The motor vehicle seat assembly according to claim 1, wherein said alarm device comprises a vehicle radio and wherein when said pulse sensor detects a pulse rate indicating that the occupant is falling asleep, said vehicle radio is turned on or a volume of said vehicle radio is increased.

8. The motor vehicle seat assembly according to claim 1, wherein said swivel mechanism further comprises at least one rail slidably engaged with a bottom surface of said seat base portion, wherein said at least one rail rotates with said seat body and said seat body is movable along said at least one rail for adjusting a position of said seat body.

* * * * *